United States Patent
Li et al.

(10) Patent No.: US 7,157,068 B2
(45) Date of Patent: Jan. 2, 2007

(54) VARIED MORPHOLOGY CARBON NANOTUBES AND METHOD FOR THEIR MANUFACTURE

(75) Inventors: Wenzhi Li, Brookline, MA (US); Jian Guo Wen, Champaign, IL (US); Zhi Feng Ren, Roslindale, MA (US)

(73) Assignee: The Trustees of Boston College, Chestnut Hill, MA (US)

( * ) Notice: Subject to any disclaimer, the term of this patent is extended or adjusted under 35 U.S.C. 154(b) by 475 days.

(21) Appl. No.: 10/151,382

(22) Filed: May 20, 2002

(65) Prior Publication Data

US 2003/0004058 A1 Jan. 2, 2003

Related U.S. Application Data

(60) Provisional application No. 60/292,486, filed on May 21, 2001.

(51) Int. Cl.
*D01F 9/12* (2006.01)
(52) U.S. Cl. .............. 423/447.3; 427/249.1; 977/843
(58) Field of Classification Search ........ 423/447.3; 977/843; 427/249.1
See application file for complete search history.

(56) References Cited

U.S. PATENT DOCUMENTS 6,054,111 A 4/2000 Antonietti et al. .......... 423/702

FOREIGN PATENT DOCUMENTS

WO WO 99/65821 12/1999

OTHER PUBLICATIONS

Cassell et al., 'Large Scale CVD Synthesis of Single-Walled Carbon Nanotubes' In *J. Phys. Chem. B* vol. 103 pp. 6484-6492 (1999).*
Pen et al., 'Synthesis or Large Arrays of Well-Aligned Carbon Nanotubes on Glass' In *Science* vol. 282 pp. 1105-1107 (Nov. 6, 1998).*
Baker, R.T.K., et al.; "Catalytic Growth of Carbon Nanofibers and Nanotubes"; (1994); *Mat. Res. Soc. Symp. Proc.*; vol. 349, 251-256.
International Search Report International Application No.: PCT/US02/15619, mailing date Sep. 20, 2002.
Li, et al.; "Large-Scale Synthesis of Aligned Carbon Nanotubes"; *Science*; (1996) 274: 1701-1703.
Li, et al.; "Growing Y Junction Carbon Nanotubes"; *Nature*; (1999); 402: 253-254.

* cited by examiner

*Primary Examiner*—Stuart Hendrickson
(74) *Attorney, Agent, or Firm*—David J. Dykeman; Greenberg Traurig, LLP

(57) ABSTRACT

The present invention describes the preparation of carbon nanotubes of varied morphology, catalyst materials for their synthesis. The present invention also describes reactor apparatus and methods of optimizing and controlling process parameters for the manufacture carbon nanotubes with predetermined morphologies in relatively high purity and in high yields. In particular, the present invention provides methods for the preparation of non-aligned carbon nanotubes with controllable morphologies, catalyst materials and methods for their manufacture.

42 Claims, 12 Drawing Sheets

VARIED MORPHOLOGY CARBON NANOTUBES AND METHOD FOR THEIR MANUFACTURE

PRIOR APPLICATIONS

This application claims priority to U.S. Provisional Application Ser. No. 60/292,486 filed on May 21, 2001.

STATEMENT AS TO FEDERALLY SPONSORED RESEARCH

The present invention was made with partial support from The US Army Natick Soldier Systems Center (DAAD, Grant Number 16-00-C-9227), Department of Energy (Grant Number DE-FG02-00ER45805) and The National Science Foundation (Grant Number DMR-9996289).

FIELD OF THE INVENTION

The present invention relates generally to carbon nanotubes of varied morphology, catalyst materials for their synthesis, and apparatus and methods for controllably manufacturing carbon nanotubes with pre-determined morphologies. More particularly, the present invention concerns non-aligned carbon nanotubes with controllable morphologies, catalyst materials and methods for their manufacture.

BACKGROUND OF THE INVENTION

Carbon nanotubes (CNTs) offer significant advantages over other materials in that they possess substantially higher strength-to-weight ratio and superior mechanical properties. A major limitation to their large-scale commercialization however, has remained the need for large quantity, cost-effective production methods. Conventional synthetic methods for synthesis of CNTs utilize arc discharge, laser ablation and chemical vapor deposition (CVD). Existing manufacturing methods using CVD are mainly directed toward obtaining aligned monolayer arrays of CNTs on a catalyst surface that is comprised of either a metallic substrate, or a non-metallic substrate whose surface is coated with a metallic material.

Metal catalysts for CNT synthesis disclosed in the art involve the deposition of a transition metal catalyst layer as a coating on a substrate by standard methods such as metal vapor deposition and magnetron sputtering. Such methods involve a combination of metallic (non-catalytic) and non-metallic substrates coated with a surface layer of a catalytic metal such as iron. They however, require relatively expensive and complex reactor apparatus, and typically require a high vacuum ($10^{-5}$ to $10^{-7}$ torr) environment. Furthermore, such methods are only capable of providing a uniform flat surface layer of the metal catalyst on the substrate on which CNT formation and growth can occur. The surface area of the catalytic metal layer therefore, is substantially similar to that of the substrate on which it is deposited. Since CNT yield is directly related to surface area of the catalytic surface, substantially large areas of metal coated substrate is required to synthesize large quantities of CNTs, which is impractical in terms of existing limitations of the reaction apparatus.

A mesoporous silica sol-gel catalyst impregnated with iron was disclosed by Li et al. (*Science*, Vol. 274, (1996), 1701) for the synthesis of aligned carbon nanotubes. The method described by Li requires the preparation of large, flat surfaces of the iron impregnated mesoporous silica substrates with uniform distribution of pores. According to Li et al., preparation of such large area catalytic substrate is hampered by the inherent tendency to shrink, crack and shatter during their preparation. Meticulous drying procedures therefore, are required to maintain the integrity of the catalyst to obtain large area surfaces, which is critical for obtaining high density monolayer CNT arrays. Imperfect catalyst preparation can severely limit yields of CNT product. Also, CNT synthesis by the process of Li et al. requires a reaction temperature of 700° C., which is impractical for substrates such as flat panel glass. Methods for producing an aligned array of linear CNTs on a substrate surface has been described in WO 99/65821 by Ren et al. in plasma conditions under an applied electrical field. Such methods however, require high vacuum conditions, which is difficult to achieve in large reactors in a commercially viable CNT manufacturing processes.

Although such methods are capable of providing highly pure, aligned CNTs, they are not best suited for large-scale production due to low volume (typically several milligrams to grams per batch), low yields based on amount of catalyst and high manufacturing cost. Furthermore, existing methods do not allow control of nanotube morphology, tubule diameter, tubule wall thickness and other structural elements that are important in achieving desired material properties that may required for specific applications. Such drawbacks are limiting factors that restrict the widespread use of CNTs in potential applications.

Most of the prior art methods provide methods for synthesis of linear CNTs without morphology control. However, the anomalous electrical properties exhibited by "kinked" or bent CNT tubules is indicative of the importance of non-linear, branched tubule structures in the development of CNT based electronic devices such as micro-transistors and nanocircuits. Although it is theoretically possible to introduce a wide range of structural defects with useful electronic properties in CNTs, synthetic limitations have precluded such introduction of systematic structural defects. Furthermore, currently available methods do not allow controlled alteration of linear tubule structures during their growth. Post growth modifications of CNTs have been difficult to implement and are prone to uncontrolled and random defects. Li et al disclose a method to synthesize a CNT with a branched Y-junction (*Nature*, (1999) Vol. 402, 253–4) that involves the deposition of carbon onto an thin aluminum sheet wherein Y-shaped molds are etched by an electrochemical process. The CNTs formed within the aluminum molds are then removed from within the said molds. The branched Y-shaped CNTs obtained by the method however, are not symmetrical with respect to arm length, straightness and angles between arms, since their shape and symmetry is determined by limitations in fabrication of the aluminum mold in which they are formed. Such processes are also not suited for large scale manufacture of CNTs and are, therefore, not economically viable for use in a commercial process.

SUMMARY OF THE INVENTION

The present invention provides CNTs with novel structural and morphological characteristics, catalyst materials for CNT synthesis and methods for manufacturing non-aligned CNTs having varied morphologies in relatively high purity wherein tubule morphology, yield and purity are all controllable by choice of optimal process parameters. Further, the present invention provides apparatus and methods for the manufacture of non-aligned CNTs with specific morphologies in relatively high purity in high yields, even at atmospheric pressure. Kilogram quantities of CNT product can be synthesized by utilization of the methods of the present invention.

The present invention provides linear and branched CNTs, particularly non-aligned CNTs, with different tubule morphologies that include, for example, (1) cylindrical hollow single-walled and multi-walled nanotube structures (SWNT and MWNT respectively), (2) conically overlapping or "bamboo-like" tubule structures, wherein successive end-capped graphene layers comprising individual tubules are staggered in a telescoping, stacked arrangement; and (3) branched or "Y-shaped" tubule structures with symmetric, straight-armed tubules forming fixed angles between individual arms. Linear CNTs as defined herein, refers to CNTs that do not contain any branches originating from the surface of individual CNT tubules along their linear axes. Branched CNTs as defined herein, refers to non-linear CNTs with at least one location along the linear tubule axis or at the tubule terminal from which one or more tubules originate, having linear tubule axes that are non-identical to the tubule from which they originate. Such points of origination of additional tubules (branch points) are also referred to herein as "junctions." Branched CNTs can include, for example, "Y-shaped" CNTs and "kinked" CNTs. The methods of the present invention allow the control of morphology and structural characteristics of individual CNT tubules during their formation, thereby enabling the synthesis of CNTs with specific morphology, structure, mechanical and chemical properties. Thus CNTs having either a cylindrical, hollow tubule structure with concentric graphene layers, or a conical "bamboo-like" structure wherein successive end-capped graphene layers are staggered in a telescoping, stacked arrangement can be produced by the methods of the present invention. These configurations are schematically illustrated in FIG. 1.

The present invention also provides catalyst materials useful for the synthesis of CNTs of pre-determined morphologies and methods for utilizing them in the manufacture of varied morphology CNTs. The catalyst materials of the invention are contacted with a carbon source gas either by itself or in combination with a promoter gas at an elevated temperature within the confines of a reaction chamber. The catalyst materials of the present invention are comprised of a substrate that includes a metallic catalyst (such as for example, a transition metal) hereinafter referred to as "catalytic substrate", a catalyst gas or "promoter gas" that is capable of promoting the activity of the catalytic substrate resulting in increased yield of the CNT products, or a combination thereof. For synthesis of linear CNTs, the catalyst material comprises a promoter gas and a catalytic substrate. For synthesis of branched CNTs, the catalyst material can comprise the catalytic substrate either by itself, or a combination of the catalytic substrate with the promoter gas. The substrate for the synthesis of symmetrical, branched (e.g., Y-shaped) CNTs comprises a transition metal that is supported on a metallic material or a non-metallic material, such as for example, a non-metallic oxide. The catalytic substrate can be either distributed within or deposited on the interior surface of the reaction chamber of the manufacturing apparatus of the invention. In one embodiment, the catalytic substrate is distributed on the surface of a reaction vessel as a thin layer. The reaction vessel containing the catalyst layer is then placed in a pyrolytic reaction chamber of a reactor apparatus comprising a heater assembly that enables deposition of carbon by pyrolysis of the carbon source gas at an elevated temperature. The carbon source gas in the methods of the present invention can additionally contain a promoter gas that enables rapid carbon deposition and CNT growth on the surface of the catalytic substrate.

Control of CNT morphology and tubule structure can be accomplished by varying the parameters of the manufacturing process described by the methods of the present invention, for example, by varying the pressure of carbon source/promoter gas mixture within the CVD reaction chamber, and by varying the reaction temperature, respectively. The pressure of the carbon source gas/promoter gas mixture may be low (about 0.001 to about 200 torr), moderate (about 200 to about 400 torr) or high (about 400 to about 760 torr). CNT morphology can be varied during their formation by the methods of the present invention depending on the of gas pressure range selected, whereby either a single morphology type or a mixture of morphologies may be selectively obtained. At low gas pressures, CNTs with a cylindrical, hollow tubule morphology is obtained, whereas higher gas pressures yield parabolically shaped (conical), telescoping stacked tubule ("bamboo-like") morphology CNTs with capped ends; CNTs with mixed tubule morphologies is attainable at a moderate pressure range. The methods of the invention also allow the control of tubule diameter, tubule length, number of concentric graphene layers (graphitization) comprising individual tubules and the yield the CNT products by variably controlling the reaction temperature of CNT synthetic process. The reaction temperature range in the methods of the invention ranges between about 600° and about 1500° C., preferably between about 700° C. and about 1200° C. In a preferred embodiment, the reaction temperature ranges between about 750° C. and about 900° C. Important structural attributes of CNTs that determine their mechanical and electrical properties can, therefore, be controlled and "tailored" for application specific requirements utilizing the methods of the invention. CNTs of pre-determined morphology and structural attributes are obtained in high yields (up to 700% based on catalyst substrate weight) by the methods of the invention. As will become evident from the embodiments and examples described herein, CNTs with precisely controlled morphology and structure can be manufactured by controlling the optimal process parameters in the methods of the invention.

In one aspect, the catalyst materials of the present invention comprise a particulate or micro-particulate, mesoporous catalyst substrate that can be used for synthesis of linear and branched CNTs. The catalytic substrate preferably is distributed on the surface of a reaction vessel as a thin layer, following which the reaction vessel containing the catalyst layer is placed in a reaction chamber of a reactor apparatus, such as for example, a chemical vapor deposition (CVD) reactor, comprising a heater assembly to enable chemical vapor deposition of carbon from a carbon source gas. In accordance with the methods of the invention, the carbon source gas is mixed with a promoter gas in the presence of the catalytic substrate at an elevated temperature within the reaction chamber. The promoter gas enables rapid chemical vapor deposition and graphitization of carbon on the catalytic substrate resulting in tubule growth on the surface and within the pores of the catalytic substrate.

An important aspect of the present invention is the preparation and utilization of different types of catalyst materials for obtaining CNTs of specific morphologies. For synthesis of linear CNTs, the catalyst material comprises a particulate or micro-particulate mesoporous catalytic substrate in combination with a promoter gas in a CVD process that provides CNT growth initiation and facilitates rapid CNT tubule growth at reaction temperatures of about 600° C., which is substantially lower than typical initiation temperatures by conventional methods (≧700° C.) in relatively high yield (up to about 700% based on catalyst weight). For synthesis of branched Y-shaped CNTs, the catalyst substrate comprises a catalytic metal composed of at least one transition metal that is supported on a metallic or non-metallic material (for example, a non-metallic oxide), which may be in particulate or micro-particulate form. The catalytic metal can be deposited on the surface of the metallic or non-metallic material as a coating on the supporting material. A promoter gas or gas mixture component additionally can be introduced in the reaction chamber during the synthesis of branched CNTs to enable rapid carbon deposition and CNT growth initiation with high graphitization. The use of the catalyst gas in the methods of the invention enables CNT growth on substrates that have relatively low strain/melting point ratios, such as for example, glass substrates used in flat panel display (strain/melting point ≦666° C.).

The present invention provides CNTs with controlled morphology (e.g., shape, tubule diameter, wall thickness and length, and graphitization) in relatively high yields and in large quantities (kilogram scale) that are easily purified by a solvent wash, and methods for their preparation and manufacture. Solvents useful for purification of CNTs of the present invention include inorganic acids, such as for example, hydrofluoric acid (HF). The carbon nanotubes formed by methods of the present invention have several applications. They can be used as an additive to provide improved strength and reinforcement to plastics, rubber, concrete, epoxies, and other materials, using currently fiber reinforcement methods for improving material strength. Furthermore, the methods of the invention provide large quantity, cost efficient synthetic processes for producing linear and branched CNTs that are suited for applications in hydrogen storage devices, electrochemical capacitors, lithium ion batteries, high efficiency fuel cells, semiconductors, nanoelectronic components and high strength composite materials.

The foregoing and other aspects, features and advantages of the present invention will become apparent from the figures, description of the drawings and detailed description of particular embodiments.

BRIEF DESCRIPTION OF THE DRAWINGS

The objects and features of the invention can be better understood with reference to the following detailed description and accompanying drawings.

FIG. 10*d* shows CNT yield dependence on reaction temperature.

DETAILED DESCRIPTION OF THE INVENTION

In one aspect, the present invention relates to linear and non-linear CNTs with specific morphological characteristics and methods for producing them. The morphology of individual CNT tubules of can be configured to be linear and cylindrical with a hollow core, or stacked, conical segments ("bamboo-like") with capped ends. In another aspect, the present invention relates to catalyst materials that are useful in manufacturing CNTs of varied morphology that are substantially free from defects in relatively high purity and in high yields. The present invention provides methods for preparation of such catalyst materials and their use in CNT synthetic processes. In yet another aspect, the present invention relates to apparatus and methods for the preparation and of varied morphology CNTs in high yields that are both conducive to commercial manufacturability and economically viable. The catalyst materials and CNT preparation methods of the present invention also allow the synthesis of CNTs with mixed morphologies by varying the appropriate reaction process parameters that are described herein.

In one embodiment, the materials containing the linear CNTs of the present invention comprise a plurality of free standing, linearly extending carbon nanotubes originating from and attached to the surface of a catalytic substrate having a micro-particulate, mesoporous structure with particle size ranging from about 0.1 μm to about 100 μm, and extending outwardly from the substrate outer surface. The morphology of individual CNT tubules is either cylindrical with a hollow core, or is end-capped, stacked and conical ("bamboo-like"). Both morphological forms may be comprised of either a single layer or multiple layers of graphitized carbon. In another embodiment, the CNTs of the present invention are separated from the catalytic substrate material and exist in a free-standing, unsupported form.

The structural attributes of the varied morphology CNTs of the present invention, the apparatus and methods for their synthesis and manufacture, and the preparation and use of catalyst materials useful in such manufacturing process is described herein with reference to the figures and diagrams.

Figure 1:
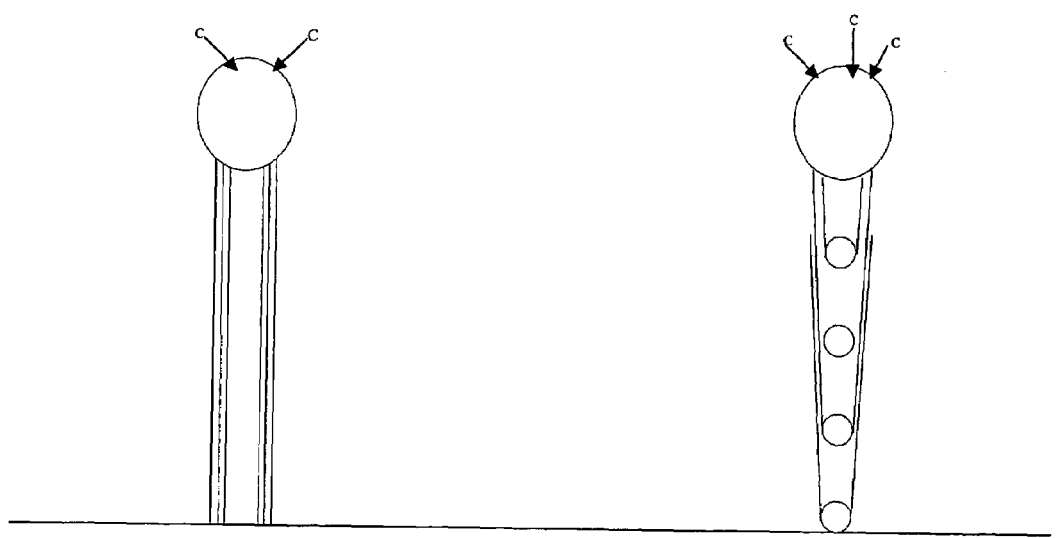
FIG. 1 is a schematic drawing illustrating carbon nanotube (CNT) morphologies.

Referring to FIG. 1, linear CNTs of the present invention are non-aligned, substantially linear, concentric tubules with hollow cores, or capped conical tubules stacked in a bamboo-like arrangement. The nanotube morphology can be controlled by choosing an appropriate catalyst material and reaction conditions in the synthetic methods of the present invention as detailed in different embodiments described herein. Depending on choice of reaction conditions, relatively large quantities (kilogram scale) of morphologically controlled CNTs substantially free of impurity related defects, such as for example, from entrapment of amorphous carbon or catalyst particles, can be obtained. The linear CNTs obtained by the methods of the present invention have diameters ranging from about 0.7 to about 200 nanometers (nm) and are comprised of a single or a plurality of concentric graphene layers (graphitized carbon). The nanotube diameter and graphene layer arrangement may be controlled by optimization of reaction temperature during their synthesis. Thus the method of the present invention allows the synthesis of carbon nanotubes with defined tubule diameters and desired layered structure.

Figure 2:
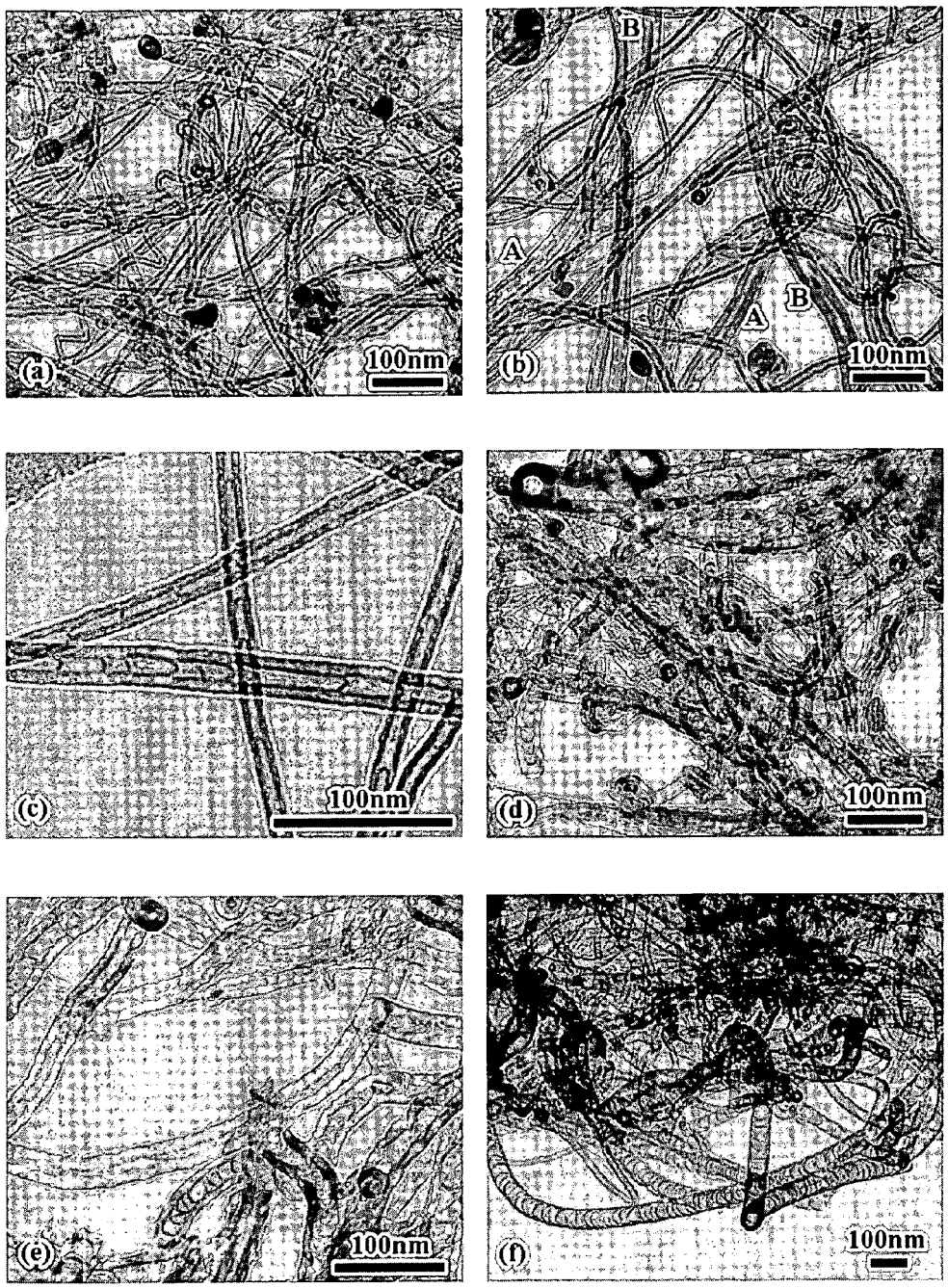
FIG. 2 shows low magnification TEM photomicrographs of CNTs grown at gas pressures of (a) 0.6 (b) 50 (c) 200 (d) 400 (e) 600 and (f) 760 torr.

Referring to FIG. 2, low magnification TEM images of linear CNTs grown at low, intermediate and high gas pressures are indicative that tubule morphology can be controllably changed by choice of gas pressure "feeding" into a reactor for CNT preparation. The control of gas pressures in the methods of the present invention is accomplished by regulating gas pressure of the gases feeding in to the reactor using conventional pressure regulator devices. CNTs grown at a gas pressure of 0.6 torr (FIG. 2a) predominantly have a morphology that consists of a tubular configuration, completely hollow cores, small diameter, and a smooth surface. At 50 torr, morphology is essentially similar to that at 0.6 torr, except that a small amount of tubules have an end capped conically shaped stacked configuration ("bamboo-like") (FIG. 2b). At a gas pressure of 200 torr, the morphology of the CNTs are predominantly the end-capped, conical stacked configuration ("bamboo-like") regardless of their outer diameters and wall thickness. The density of the compartments within individual tubules of the CNTs is high, with inter-compartmental distance inside these "bamboo-like" structures ranging from 25 to 80 nm (FIG. 2c). At gas pressures greater than 200 torr, an entirely "bamboo-like" morphology is obtained for the CNTs, with increased compartmental density. The inter-compartmental distances within the individual CNTs decrease with increasing gas pressure (10–50 nm at 400 torr and 10–40 nm at 600 and 760 torr respectively). CNTs synthesized at 760 torr have a wider tubule diameter (20 nm to 55 nm (FIG. 2f), have thin walls and smooth surfaces. In comparison to linear CNTs synthesized at a gas pressure of 200 torr, those synthesized at higher pressures (400 and 600 torr) are highly curved and have broken ends (FIGS. 2d and 2e). This is attributed to fracturing of the CNTs during the TEM specimen preparation, which is indicative that CNTs with a "bamboo-like" morphology may be readily cleaved into shorter sections compared to the tubular type.

Figure 3:
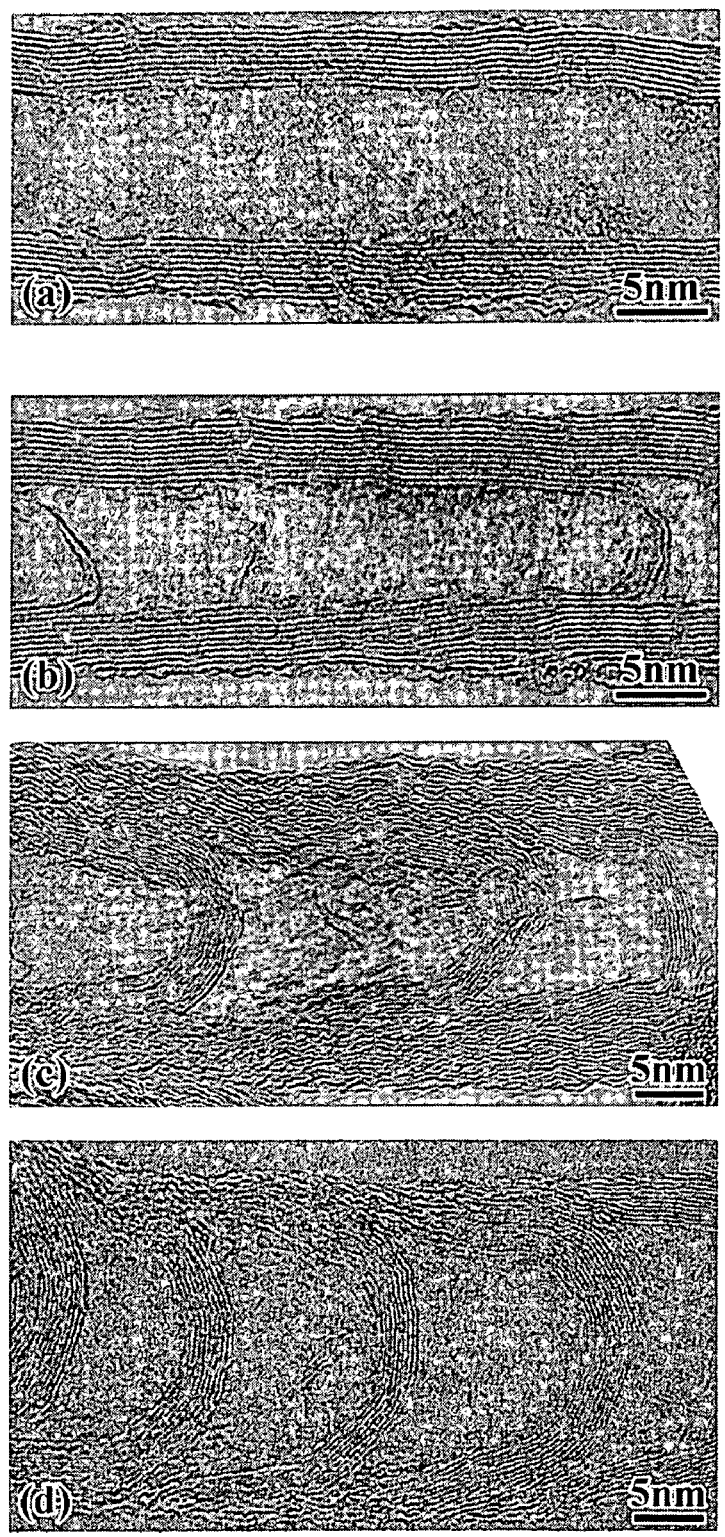
FIG. 3 shows high magnification TEM photomicrographs of CNTs grown at gas pressures of (a) 0.6 (b) 200 (c) 400 and (d) 760 torr.

CNTs of the present invention have a relatively high degree of graphitization (process of forming a planar graphite structure or "graphene" layer). The complete formation of crystalline graphene layers, and the formation of multiple concentric layers within each tubule and hollow core, with minimal defects (such as those typically caused by entrapment of non-graphitized, amorphous carbon and metal catalyst particles) is an important prerequisite for superior mechanical properties in CNTs. Referring to FIG. 3 which shows TEM photomicrographs detailing morphologies of linear CNTs grown at different gas pressures, it is seen that CNTs grown at pressures between 0.6 to 200 torr have good graphitization, their walls comprising of about 10 graphene layers all of which terminate at the end of the CNT that is distal from the substrate (i.e. the fringes are parallel to the axis of the CNT), and possess completely hollow cores. Linear CNTs grown at 200 torr have tubule walls comprising about 15 graphene layers. Individual tubules are "bamboo-like" rather than completely hollow, with diaphragms that contain low number ($\leq 5$) of graphene layers. All graphene layers terminate at the surface of the CNTs, with the angle between the fringes of the wall and the axis of the CNT (the inclination angle) being about 3° (FIG. 3b). Linear CNTs grown at intermediate gas pressures (400–600 torr) have a "bamboo-like" structure, more of graphene layers in the walls and diaphragms of tubules (typically 25 and 10 graphene layers in their walls and diaphragms, respectively (FIG. 3c), but less graphitization (lower crystallinity) due to a faster growth rate. Despite the low crystallinity, all graphene layers terminate on the tubule surface with inclination angle of about 6°. CNTs grown at 760 torr have higher graphitization than those grown at 400–600 torr, have a "bamboo-like" structural morphology consisting of parabolic-shaped layers stacked regularly along their symmetric axes (FIG. 3d). All the graphene layers terminate within a short length along growth direction on the surface of the CNTs resulting in a high density of exposed edges for individual layers. The inclination angle of the fringes on the wall of the CNTs is about 13° (FIG. 3d). The high number of terminal carbon atoms on the tubule surface is expected to impart differentiated chemical and mechanical properties in these CNTs compared the hollow, tubular type, and render them more amenable for attachment of organic molecules.

In another aspect, the present invention relates CNTs comprising a branched ("Y-shaped") morphology, referred to herein as "branched CNTs", wherein the individual arms constituting branched tubules are either symmetrical or unsymmetrical with respect to both arm lengths and the angle between adjacent arms. In one embodiment, the Y-shaped CNTs exist as (1) a plurality of free standing, branched CNTs attached to the substrate and extending outwardly from the substrate outer surface; and (2) one or more CNTs with a branched morphology wherein the CNT tubule structures have Y-junctions with substantially straight tubular arms and substantially fixed angles between said arms.

Figure 4:
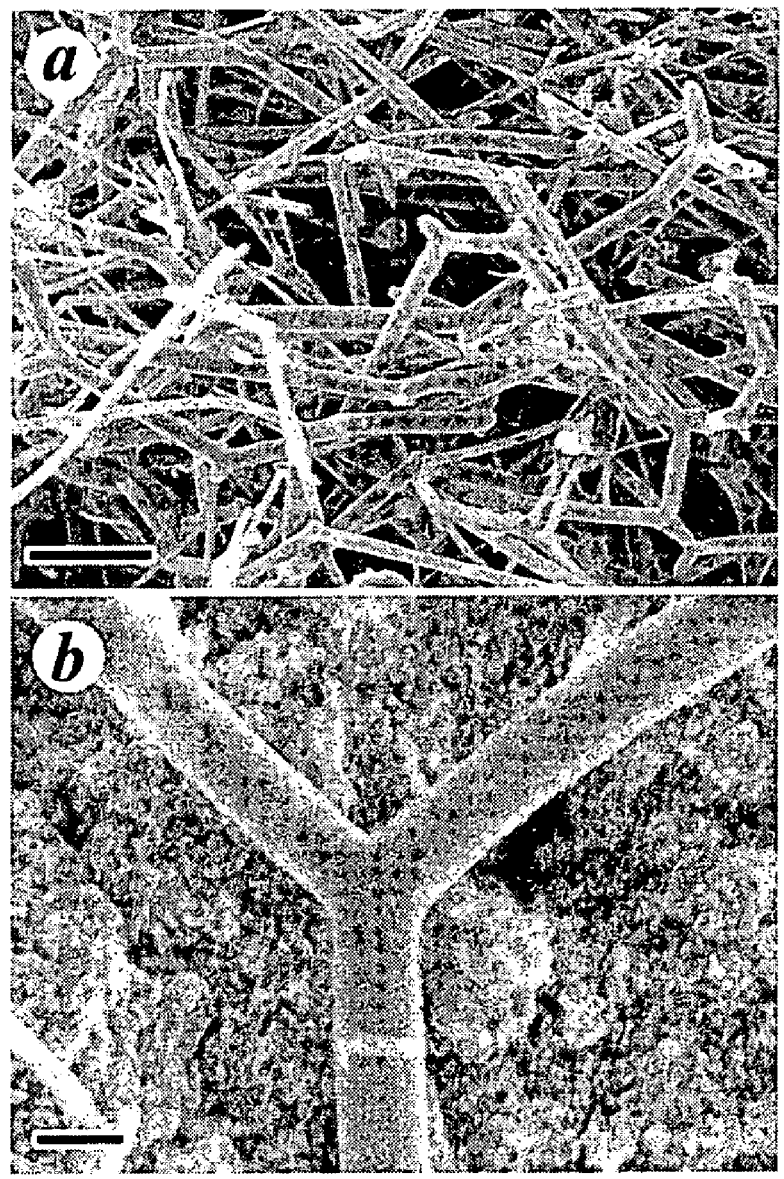
FIG. 4 shows SEM photomicrographs of symmetrically branched (Y-shaped) CNTs at (a) low magnification (scale bar=1 μm) and (b) high magnification (scale bar=200 nm).

As seen in FIG. 4, branched CNTs synthesized by the methods of the invention comprise a plurality of Y-junctions with substantially straight arms extending linearly from said junctions. The majority of branched CNTs possess Y-junctions having two long arms that are a few microns long (about 2 to about 10 μm), and a third arm that is shorter (about 0.01 to 2 μm). CNTs with Y-junctions comprising three long arms (up to about 10 μM), and with multiple branching forming multiple Y-junctions with substantially linear, straight arms can be also obtained by the method of the invention. High magnification SEM micrograph (FIG. 4b) shows that the branched CNTs of the invention possess Y-junctions that have a smooth surface and uniform tubule diameter about 2000 nm. The angles between adjacent arms are close to about 120°, thereby resulting in branched CNTs that have a substantially symmetric structure. All Y-junctions have a substantially similar structural configuration, regardless of their varying tubule diameters.

Figure 5:
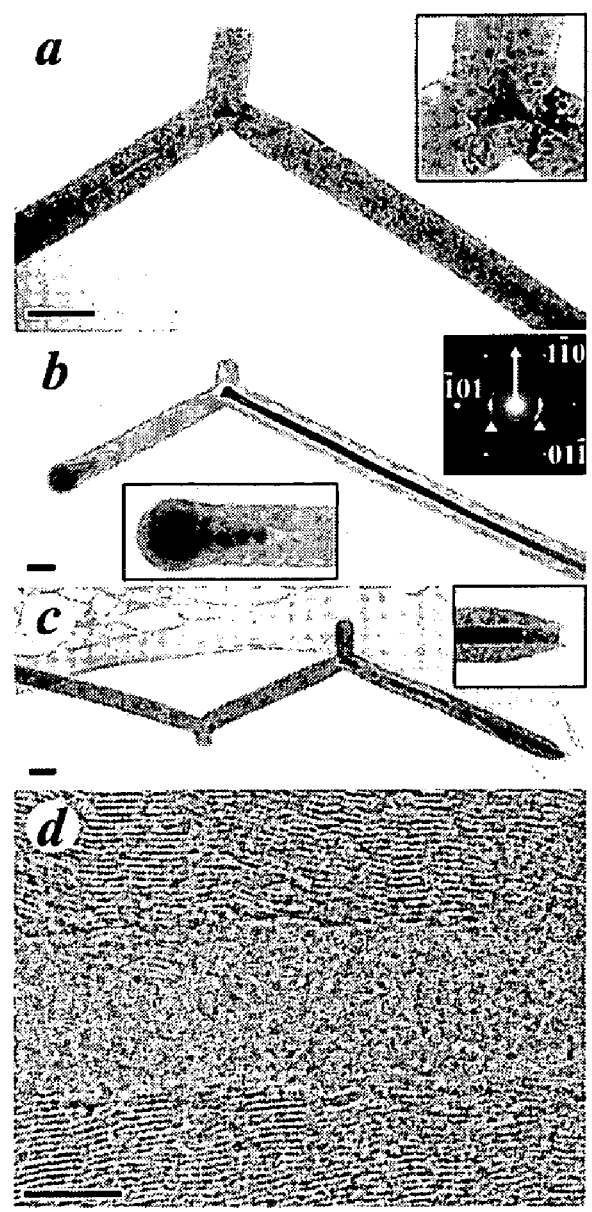
FIG. 5 shows TEM photomicrographs branched CNT Y-junctions with (a) straight hollow arms and uniform diameter (scale bar=100 mn) (b) pear-shaped particle cap at tubule terminal (scale bar=100 nm) (expanded in bottom inset) and XDS photomicrograph (top right inset) showing composition of particle (c) a branched CNT with a double Y-junction (scale bar=100 nm) (open tubule shown in inset) and (d) high resolution partial image of a well graphitized, hollow tubule Y-junction.

Referring to FIG. 5, it is seen that most Y-junctions of branched CNTs of the present invention have hollow cores within their tubular arms (FIG. 5a). A triangular, amorphous particle is frequently found at the center of the Y-junction (inset in FIG. 5a). Compositional analysis by an energy dispersive x-ray spectrometry (EDS) indicates that the triangular particles consist of calcium (Ca), silicon (Si), magnesium (Mg), and oxygen (O). The Ca and Si are probably initially contained in the catalyst material. It is frequently observed that one of the two long arms of the Y-junction is capped with a pear-shaped particle (FIG. 5b and lower inset), that a similar chemical composition as that of the aforementioned triangle-shaped particle found within the tubules at the Y-junction. A trace amount of cobalt (Co) from the catalytic material is found at the surface of such pear-shaped particle. The tubule of the other long arm of the branched CNT (FIG. 5b) is filled with crystalline magnesium oxide (MgO) from the catalytic material (confirmed by diffraction contrast image in the EDS spectrograph). Selected area diffraction patterns (upper right inset in FIG. 5b) indicate that one of <110> reflections, [101], of the MgO rod is parallel to [0002] reflection (indicated by arrow heads) from carbon nanotube walls. Therefore, MgO rod axis is along [210]. Additionally, Y-junctions filled with continuous single crystalline MgO from one arm, across a joint, to another arm can also be obtained. FIG. 12c shows a double Y-junction, wherein only one arm of the right-side Y-junction is filled with single crystal MgO. FIG. 5b (inset) shows a magnified image of the end of the MgO filled arm, illustrating an open tip that provides entry of MgO into the CNT Y-junctions. FIG. 5d shows a highly magnified partial Y-junction, which is well graphitized, and consists of about 60 concentric graphite layers (partially shown) in its tubule arms, and a hollow core with a diameter of about 8.5 nm.

Linear CNTs produced according to the present invention can be utilized to form composites with other materials, especially dissimilar materials. Suitable dissimilar materials include metals, ceramics, glasses, polymers, graphite, and mixtures thereof. Such composites may be prepared, for example, by coating the products of the present invention with these dissimilar materials either in a solid particulate form or in a liquid form. A variety of polymers, including thermoplastics and resins can be utilized to form composites with the products of the present invention. Such polymers include, for example polyamides, polyesters, polyethers, polyphenylenes, polysulfones, polyurethanes or epoxy resins. Branched CNTs of the present invention can find application in construction of nanoelectronic devices and in fiber-reinforced composites. The Y-junction CNT fibers of the invention are expected to provide superior reinforcement to composites compared to linear CNTs.

The present invention also provides catalyst materials for synthesis of morphologically controllable CNTs that comprise a catalyst substrate and a promoter gas that is used in combination with a carbon source gas. The catalytic substrate component can be used in the CNT synthetic process either by itself to cause reaction of the carbon source gas, or in combination with the promoter gas that is mixed with the carbon source gas. The catalyst substrate component of the present invention comprises either a single metallic material or combination of metals, a metallic alloy, a metal/metallic alloy combination, organometallic compounds, or combinations thereof that is impregnated with or deposited on the surface and within the pores of a particulate or microparticulate, mesoporous sol-gel. The micro-particulate sol-gel can be, for example, mesoporous silica, mesoporous alumina or mixtures and combinations thereof. A combination of sol-gels may also be used as the catalyst substrate component.

In a preferred embodiment, the metallic material is impregnated into the sol-gel as nanoparticles. Particle sizes of the catalyst substrate materials range between about 0.01 and about 100 microns (μM). Due to their particulate and porous nature, the catalyst substrate materials of the present invention provide a catalyst surface area (relative to the of weight of catalyst substrate) that is substantially higher than traditional catalysts used for CNT synthesis, and therefore, provide substantially higher yields of CNT product. The catalytic substrates constituting the catalyst materials of the present invention for producing branched CNTs preferably comprise at least one transition metal or metal alloy that is deposited on or impregnated within a support substrate comprising a metallic material or a non-metallic material, such as for example, a non-metallic oxide. The metallic material or non-metallic oxide comprising the catalytic substrate can be either a transition or a non-transition metallic oxide, or a non-metallic inorganic oxide. Preferred metallic materials in the catalytic substrates of the invention include iron, cobalt, nickel, or alloys and combinations thereof. Preferred transition metals include iron, cobalt and nickel. In a currently preferred embodiment, the transition metal is cobalt. Metallic oxides useful in the catalyst materials include, for example, oxides of beryllium, magnesium, calcium, strontium and barium. Preferred metallic oxides include magnesium oxide and calcium oxide. In a currently preferred embodiment, the metallic oxide is magnesium oxide (MgO).

Preferred organometallic compounds are metallocenes, such as for example, ferrocene, nickelocene, a ferrocene-xylene mixture, or combinations thereof. The organometallic compounds can be additionally combined with an organic compound, such as for example, a combination of nickel-ocene and thiophene. The metallic oxide support substrate of the invention can be either in fused pieces or in a particulate form. Preferred forms for the metallic oxide support includes fused pieces or fused particles (average size from about 0.1 to about 1000 μm). In a currently preferred embodiment, the catalytic substrate comprises iron nanoparticles that are impregnated in mesoporous silica, which is ground into micro-particles to increase reactive surface area of the catalyst substrate. In a preferred embodiment, the particle size of the catalyst substrate ranges from about 0.1 to about 100 μm. In a current embodiment, the metallic oxide support substrate has an average particle size of about 50 μM.

In a one embodiment, the catalytic substrate of the invention for producing branched CNTs is prepared by immersing metallic oxide particles, such as for example, magnesium oxide, in an alcoholic metal salt solution, such as for example cobalt nitrate, under conditions sufficient to cause the cobalt to become impregnated into the metallic oxide. The magnesium oxide with impregnated cobalt is filtered, dried and calcined at elevated temperature (preferably about 130° C.) for an extended period of time (preferably about 14 hours).

The promoter gas component of the catalyst materials of the present invention can be a substance that is a gaseous compound at the reaction temperatures, and preferably comprises a non-carbon gas such as ammonia, ammonia-nitrogen, hydrogen, thiophene, or mixtures thereof. The promoter gas of the present invention may be diluted by mixing it with a diluent gas, which are primarily unreactive, oxygen-free gases, such as for example, hydrogen, helium, nitrogen, argon, neon, krypton, xenon, hydrogen sulfide, or combinations thereof. For the CVD reaction process of the present invention, hydrogen is preferred for reaction temperatures maintained at less than about 700° C., while for higher temperatures ($\geq 700°$ C.), the promoter gas is chosen from ammonia, hydrogen, nitrogen, or any combination thereof. The promoter gas can be introduced into the reaction chamber of the reaction apparatus (e.g. the CVD reaction chamber) at any stage of the reaction process. Preferably, the promoter gas is introduced into the reaction chamber either prior to or simultaneously with the carbon source gas. The CNT nanotube nucleation process on the catalyst substrate is catalyzed by the promoter gas of the present invention enables every metal catalyst "cap" that is formed within individual tubules to catalyze their efficient and rapid growth.

The carbon source gas of the present invention can be saturated, unsaturated linear branched or cyclic hydrocarbons, or mixtures thereof, that are in either in the gas or vapor phase at the temperatures at which they are contacted with the catalytic substrate material (reaction temperature). Preferred carbon source gases include methane, propane, acetylene, ethylene, benzene, or mixtures thereof. In a currently preferred embodiment, the carbon source gas for the synthesis of linear CNTs is acetylene, and for the synthesis of branched CNTs, the carbon source gas is methane.

Production of linear CNT materials of the present invention is accomplished by distribution of micro-particulate catalyst substrate on the surface of an open container (boat), which is then placed into the reaction chamber of a CVD apparatus and exposed to a flow of a gas mixture containing the carbon source gas and a promoter gas. The reaction temperature, gas pressure and reaction time are maintained under predetermined conditions effective to cause formation and growth of a plurality of carbon nanotubes on the catalyst substrate surface. The CVD chamber temperature and gas pressure are optimized to control and obtain the desired the morphology of carbon nanotubes during their growth.

Figure 6:
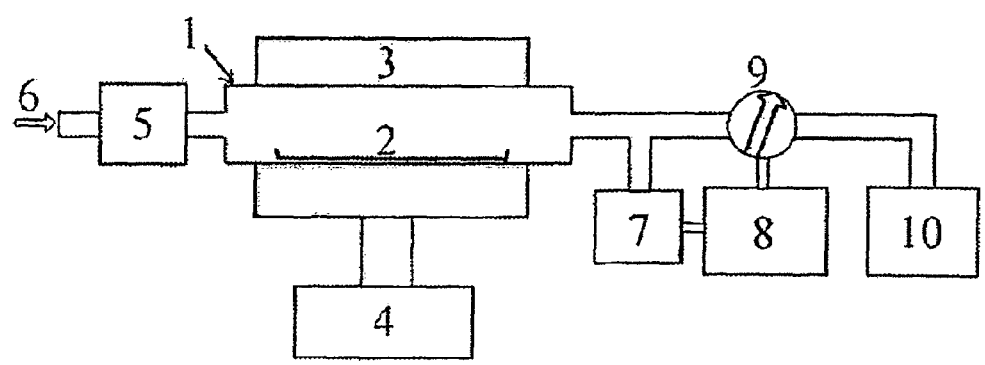
FIG. 6 shows a schematic illustration of the manufacturing apparatus and set up for CNT synthesis.

FIG. 6 shows a schematic illustration of one embodiment of a manufacturing apparatus and assembly for CNT production by the method of the invention by a batch process. A reaction chamber 1 has an internal volume capable of accommodating sample boat 2 that is capable of containing the catalyst material for CNT growth. Chamber 2 comprises a heater 3 controlled by a controller 4 that enables the reaction temperature inside chamber 2 to be maintained at a level so as to enable initiation of CNT growth. The flow rate of the carbon source gas and promoter gas mixture 6 into chamber 2 is controlled by a mass flow controller 5. Pressure transducer 7 enables monitoring of gas pressure inside chamber 2 which is controlled by valve 9 that is operated by valve controller 8. Vacuum pump 10 is capable of evacuating and maintaining the appropriate pressure inside chamber 2. The manufacturing apparatus and assembly of the present invention can be readily configured by standard methods known in the art to function in a continuous process for the scaled up synthesis of CNTs with controlled morphology. In a one embodiment, linear CNTs of the present invention are synthesized by the CVD deposition of a carbon source gas in a reaction chamber in the presence of a promoter gas on a metal impregnated, micro-particulate mesoporous silica sol-gel catalyst, while maintaining an optimum reaction temperature range (between about 600° and about 1500° C.). The volume ratio of carbon source gas to promoter gas is maintained between 1:2 to 1:10 and optimum gas pressure is preferably maintained between about 0.1 to about 760 torr.

In another embodiment, branched CNTs of the invention are synthesized in high purity and yield by pyrolysis of a carbon source gas at elevated temperature in the presence of the catalyst material. In a currently preferred embodiment, branched CNTs are synthesized by pyrolysis of a carbon source gas, such as for example methane, on a catalyst substrate comprising a transition metal deposited on a metal oxide at a temperature of about 1000° C. for about 1 hour. A promoter gas such as for example, ammonia, hydrogen, nitrogen, thiophene or mixtures thereof is additionally introduced into the reaction chamber to provide rapid growth of CNTs. The carbon source gas flow is maintained between about 1 sccm and about 1000 sccm (standard cubic centimeter/minute), and the reaction temperature is maintained between about 600° C. and about 1500° C.

The manufacturing methods of the invention also enable the tailoring of linear CNT morphology by controlling gas pressure. At relatively low pressures, CNTs with a tubular hollow structure can be obtained, whereas at relatively high pressures, CNTs with "bamboo-like" structure and increased compartmental density can be obtained. The number of graphene layers, which is related to thickness of the tubule wall and diaphragm of the CNTs, can also be controlled during their formation by control of gas pressure. Once the first layer forms as a bamboo-like structure, all subsequent layers terminate on the surface of the CNT.

Figure 7:
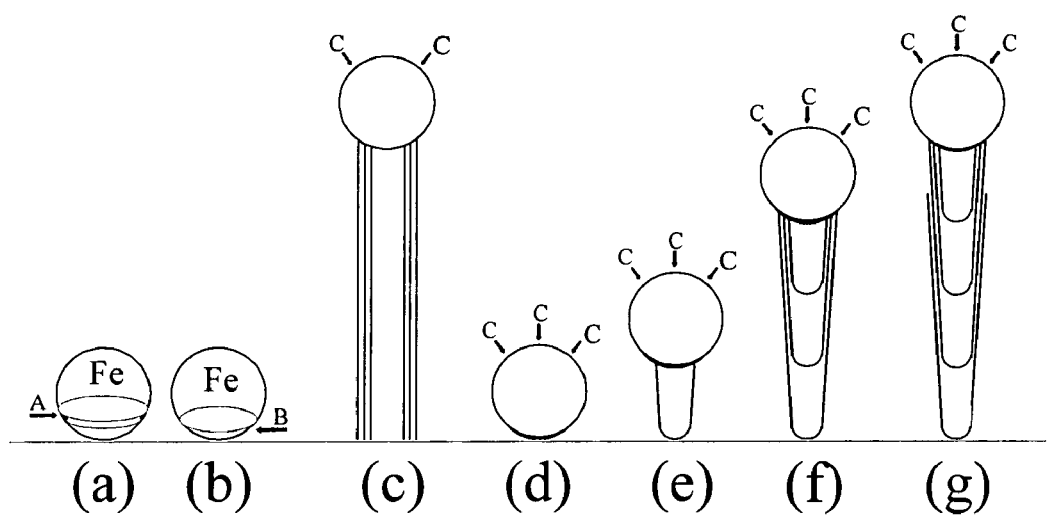
FIG. 7 shows schematic drawing of proposed mechanism of CNT growth at different gas pressures.

The methods of the present invention allow the process parameters for CNT formation to be varied optimally, thereby enabling controllable formation of CNTs with predetermined morphologies. The growth mechanism for linear CNTs obtained by the methods of the invention likely involves the outward growth from the both the surface and from within the pores of the mesoporous catalyst substrate. Carbon atoms from the carbon gas source dissolve into catalyst droplets, diffuse through the catalytic particle and precipitate on the other side of the catalyst droplet to form CNTs. The effect of growth rate and CNT tubule morphology on gas pressure affects the two different carbon atom precipitation areas (a and b) on the mesoporous catalyst substrate comprising iron (Fe) particles are shown in FIG. 7. Since the carbon source gas substantially decomposes into carbon atoms involved in CNT tubule growth, such a variation of reaction gas pressure results in a change in carbon atom concentration, which, in turn, influences the manner in which CNT tubules grow. At low pressure, when concentration of the carbon atoms is low and both dissolution and diffusion are limited, carbon atoms dissolved into the catalyst particles prefer to diffuse towards area a rather than the distant, opposite area b. The carbon atoms precipitated in area b form completely hollow CNTs. Due to the low concentration of the carbon atoms, the growth rate of CNTs is suppressed, so the yield is relatively low. At high reaction gas pressure, the concentration of carbon atoms increases, the dissolution rate of carbon atoms into the catalyst particles increases, resulting in an increase in the concentration of carbon atoms dissolved inside the catalyst particles. The enriched carbon atoms can diffuse towards both areas a and b on the catalyst particles, then the carbon atoms precipitate to form dome-like carbon shell (FIG. 7*c*); for simplification only one graphene layer is shown). However, due to the low concentration of carbon atoms and the steric characteristic of the catalyst particles the diffuse rates towards area a is greater than that towards area b. The precipitation rates of carbon atoms at area a is therefore, faster than in area b. Consequently, a concentric graphene layer with closed cap and defined length forms (FIG. 7*d*). A second dome-like carbon shell is formed subsequently in a similar manner. This process is repetitive and results in multiple analogous capped graphene layers that are separated by a fixed distance along the direction of tubule growth (growth axis), resulting in a "bamboo-like" CNT with uniform density of compartments (FIG. 7*e*). The concentric graphene layers have a relatively larger diameter at the growth ends than at the capped ends. While the diameters at the capped ends are fixed after their formation, the diameters at the open growth ends continue to increase with continued tubule growth. Once the larger open end diameter of a graphene layer exceeds the carbon precipitation area a on the catalyst particle, the layer stops growing due to non-availability of carbon atoms, and leaves its edge on the surface of CNTs (FIG. 7f). As this process continues, all the initial inner layers shift out, in turn, to the surface then terminate in a regular manner. At high carbon atom concentrations obtained at high reaction gas pressure, the dissolution, diffusion and precipitation rates of carbon atoms increase substantially. As a result, a plurality of graphene layers precipitate to form a multi-layered diaphragm in the "bamboo-like" CNT. CNTs grown at a high precipitation rate of carbon atoms therefore, have high compartmental density, which is indicative of the graphene layers being shifted out to the surface at a high rate. As a result, the graphene layer edges exposed on the surface of the CNTs also have a high density and a high inclination angle with reference to the CNT axis.

Figure 8:
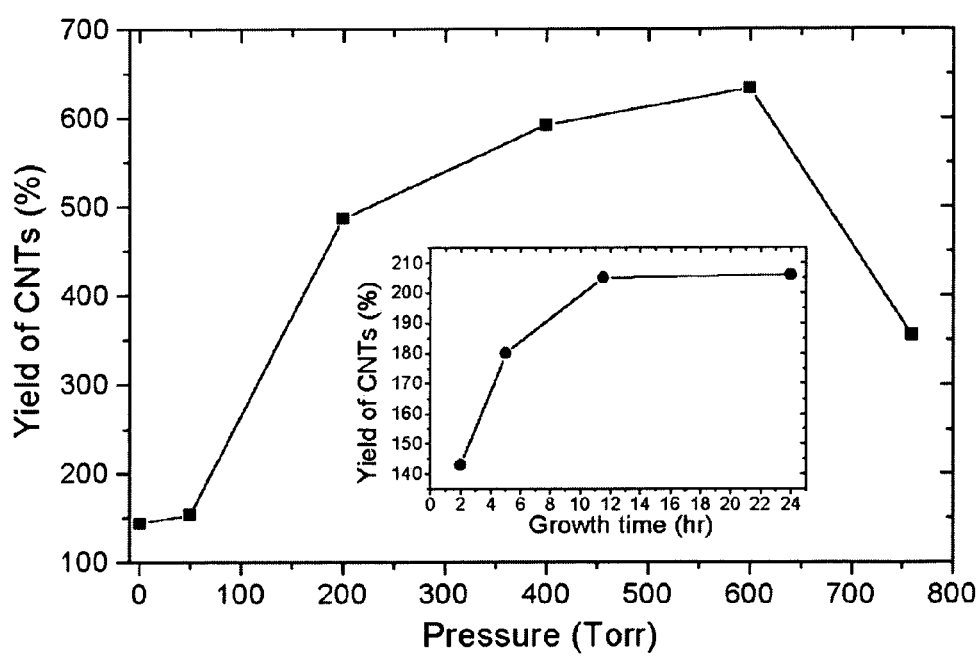
FIG. 8 shows yield of CNTs (as a weight ratio of CNTs to catalyst substrate) as a function of different gas pressures. Inset shows CNT yield with reaction time.

The manufacturing methods of the present invention provide high yields of linear CNTs relative to current methods; yields of up to about 700% based on weight of catalyst substrate can be obtained by choice of optimal process parameters provided by the methods of the present invention as described herein. In one embodiment of the invention, the yield (weight ratio of CNTs to the catalyst substrate) of CNTs is optimized by maintaining optimum gas pressure and reaction temperature in the chamber during the growth. In a currently preferred embodiment, the catalyst substrate is iron embedded mesoporous silica. The effect of controlling gas pressure on CNT yield in the methods of the invention is shown in FIG. 8. The relative yield (based on weight of catalyst substrate) is lower at low and high gas pressures (about 140% and about 350% at around 0.6 torr and 760 torr, respectively), and is substantially higher at intermediate pressures (over 600% at around 600 torr). The methods of the present invention further provide the ability to increase CNT yield by selecting an optimal reaction time for CNT formation at a pre-selected optimal gas pressure. As shown in FIG. 6 (inset), the CNT yield increases substantially with an increased reaction time; for example, compared to the CNT yield after a reaction time of 2 hours, the relative yield increases by about 25% at around 5 hours and over 40% at about 12 hours. The optimal relative yield of CNTs can therefore, be maximized at for a selected gas pressure (for example, a relative CNT yield of about 200% can be obtained for a reaction time of 12 hours at 0.6 torr) by the methods of the present invention.

Figure 9:
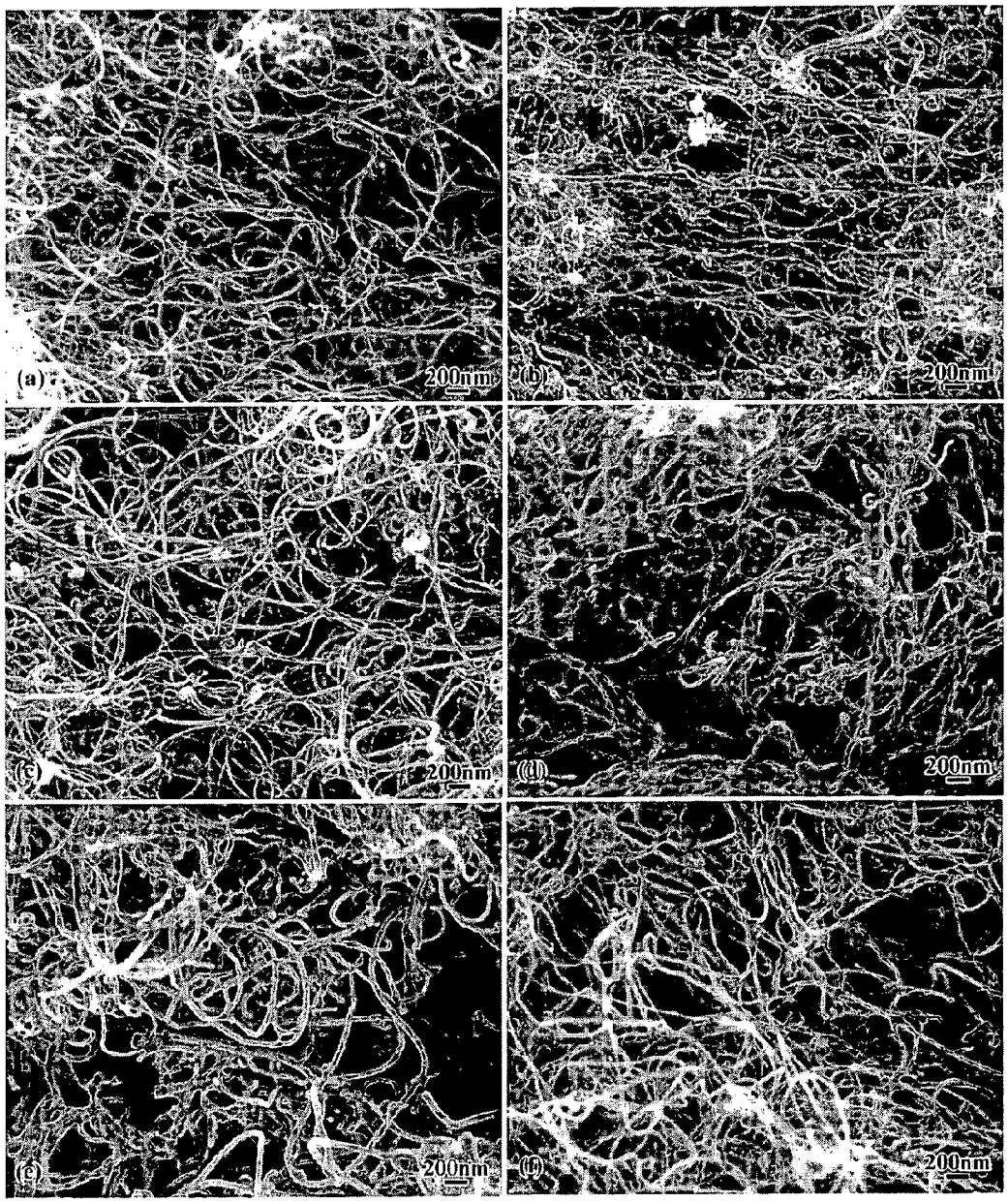
FIG. 9 shows SEM photomicrographs of CNTs grown at gas pressures of (a) 0.6 (b) 50 (c) 200 (d) 400 (e) 600 and (f) 760 torr.

The methods of the present invention further provides the ability to control CNT morphology, including individual tubule diameter size and surface roughness, particularly for linear CNTs during their formation. FIG. 9 shows scanning electron microscopy (SEM) photomicrographs of the CNTs grown at gas pressures ranging from about 0.6 torr to about 760 torr. CNTs grown at relatively low gas pressures of about 0.6 torr to about 50 torr have relatively smaller individual tubules with diameters that are distributed over a narrow range, smooth surfaces and a tubule length of about 10 to 20 μm (FIGS. 9a and 9b). At relatively moderate gas pressures (about 200 torr), a fraction of CNTs tubules with relatively larger, non-uniform diameters with smooth surfaces are observed (FIGS. 7c). In contrast, CNTs grown at relatively higher gas pressures (about 400 torr to about 600 torr) have larger uniform tubule diameters, increased surface roughness, exhibit higher degrees of curvature and have relatively shorter tubule lengths (FIGS. 7d and 7e). At gas pressures above around 760 torr, the CNT tubule diameters are non-uniform (FIG. 7f) and bear similarity to those obtained around 200 torr; tubule surfaces are however, smooth. When observed under SEM under identical conditions, photomicrographs obtained for CNTs synthesized below 200 torr are much clearer than those synthesized above 400 torr. This observation, combined with the difference in morphologies, is indicative of micro-structural differences between these CNTs obtained at different pressures. SEM photomicrographs further indicate that CNTs synthesized over the entire range of pressures by methods of the invention have a relatively high degree of purity.

The methods of the present invention provide yet another way of controlling CNT yield (particularly for linear CNTs) by optimally adjusting reaction temperature during CNT formation. Table 1 shows the dependence CNT yield on reaction (growth) temperature. CNT yield by the methods of the invention is highest at intermediate reaction temperatures (reaching about 700 weight % relative to weight of substrate catalyst). The yields listed in Table 1 are for CNTs in a CVD reaction comprising a microparticulate catalyst substrate that is distributed as a thick layer (mechanical spreading of about 100 mg micro-particulate catalyst substrate on the surface of a rectangular sample boat). Since CNT yields by the methods of the invention is directly dependent on catalyst surface area, higher yields can be obtained by spreading the catalyst particle layer over a larger area within the reaction chamber.

TABLE 1

Temperature dependence on yield of CNTs obtained by CVD process

| Reaction temperature (° C.) | 650 | 700 | 750 | 800 | 900 | 950 | 1000 | 1050 |
|---|---|---|---|---|---|---|---|---|
| CNT yield (weight %)* | 30 | 177 | 388 | 378 | 689 | 644 | 481 | 235 |

*Relative yield based on weight of substrate catalyst

Figure 10:
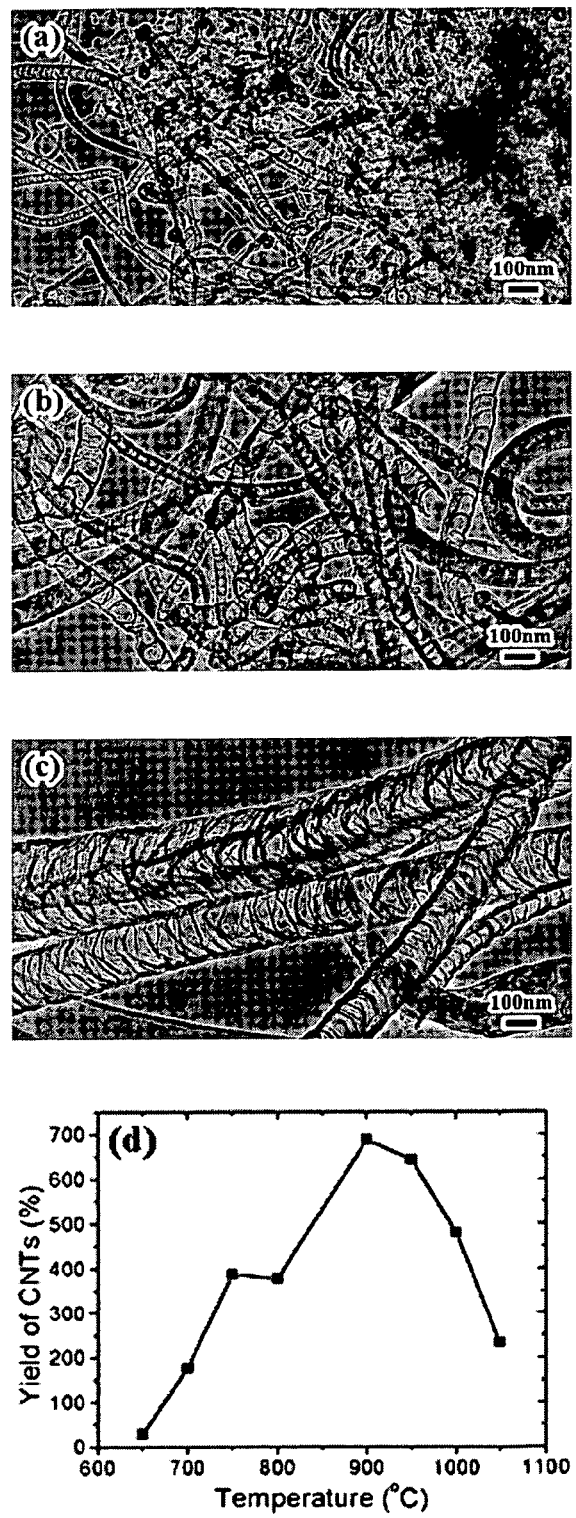
FIGS. 10 *a–c* shows low magnification TEM photomicrographs of "bamboo-like" CNTs synthesized at (a) 800° C. (b) 950° C. and (c) 1050° C.
Figure 11:
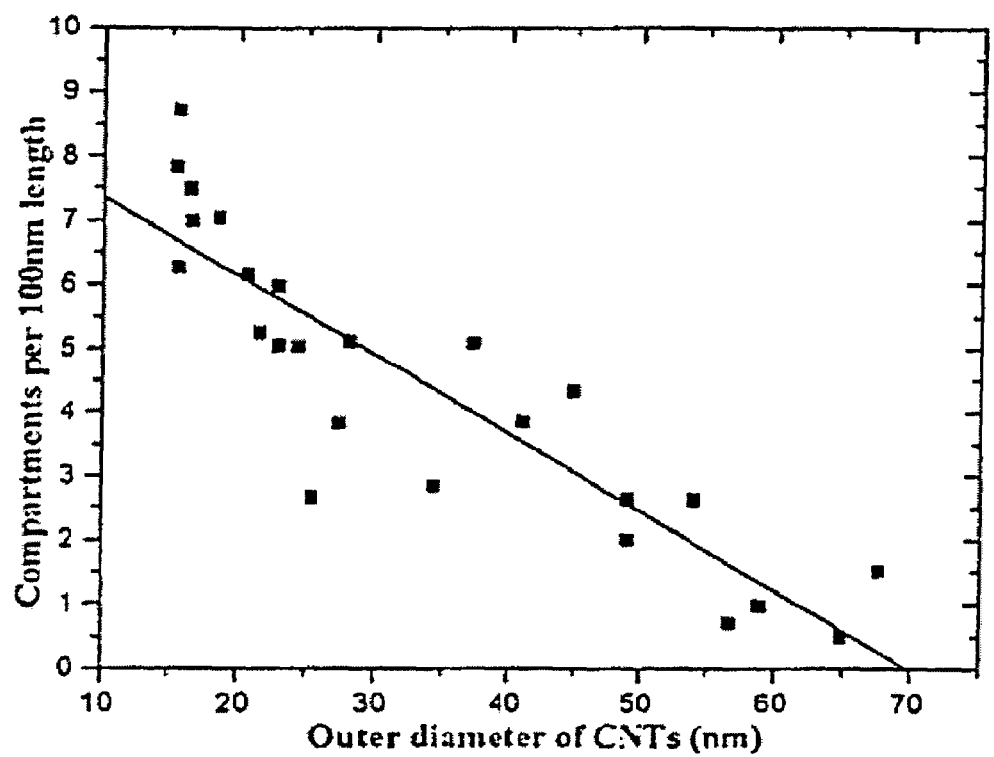
FIG. 11 shows tubule diameter dependence on compartmental density of "bamboo-like" CNTs synthesized at 800° C.

The methods of the present invention allow the control of CNT morphology and individual tubule structure, particularly for linear CNTs by controlling the reaction temperature during CNT formation. Based on the low magnification TEM photomicrographs of the CNTs grown at various temperatures (FIG. 10) by the methods of the present invention, it is seen that all the CNTs have a "bamboo-like" structure. The interiors of CNT tubules show that the structure is identical along their length, with the compartments being spaced in an almost equidistant manner. For example, the density of the compartments per about 100 nm along the tubule axial length was measured from the TEM photomicrographs of CNTs obtained at a reaction temperature of 800° C. (FIG. 11). The compartmental density decreases with the increasing of diameters of the CNTs, and is dependent on the CNT growth temperatures. The tubule diameters of CNTs vary over a relatively wide range at as a function of CNT growth temperatures. CNTs tubules grown in the range spanning 650° C., 750° C., 800° C., 950° C. and 1050° C. have diameters ranging from about 10 to about 20 nm, about 20 to about 54 nm, about 20 to about 69 nm, about 20 to about 88 nm, and about 60 to about 186 nm, respectively. Although the overall distribution of CNT tubule diameter increases with the increase in CNT growth temperature, a majority of tubules have diameters that are distributed over a relatively narrow range, particularly at higher reaction temperatures. Since the tubule diameters of the CNTs are primarily determined by the size of catalyst particles involved in the reaction process, such as for example, a CVD process, the increase of CNT diameter with increasing reaction temperature is indicative of larger catalyst particles being formed at higher growth temperatures.

Figure 12:
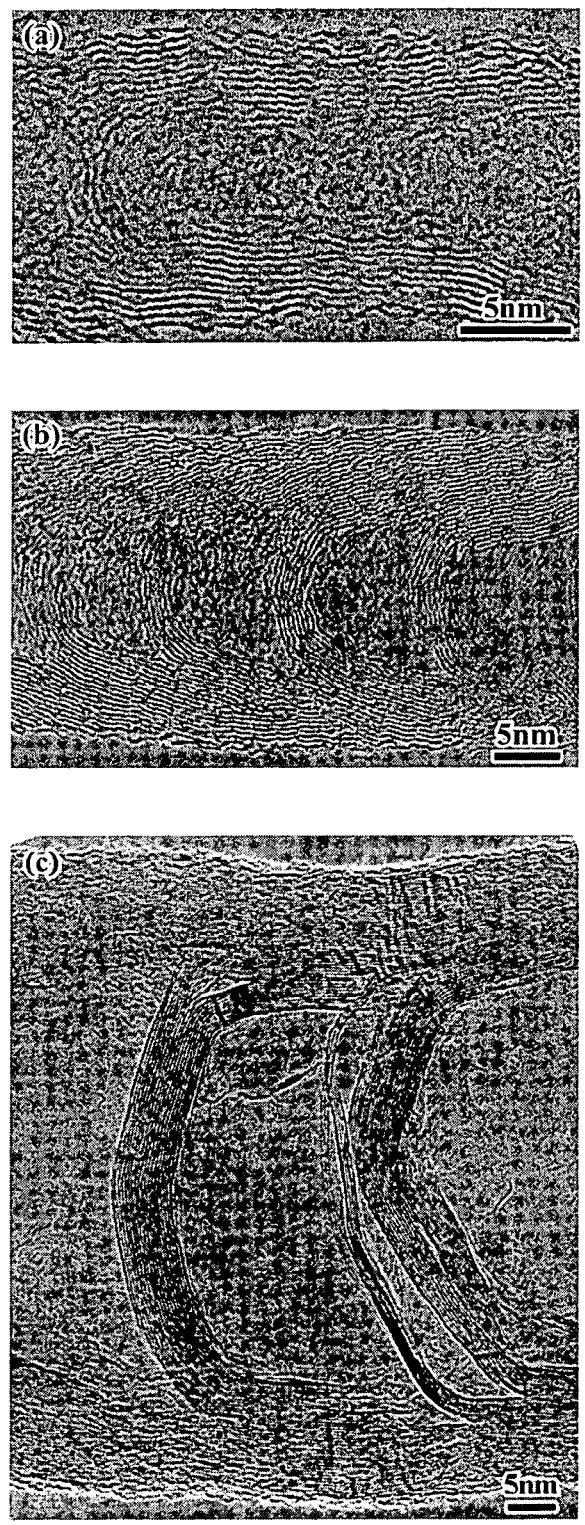
FIG. 12 shows high-resolution TEM photomicrographs of "bamboo-like" CNTs synthesized at (a) 650° C. (b) 800° C. and (c) 1050° C.

Besides control of CNT tubule diameter, the methods of the present invention allows for the control of graphitization of individual tubules and the number of concentric graphene layers comprised in the CNTs can be controlled by controlling reaction CNT growth temperatures in the methods of the present invention. FIG. 12 shows high magnification TEM images of CNTs grown at varied temperatures. With increasing growth temperatures, for example at about 650° C., 800° C., and 1050° C., the CNT tubule outer diameters are approximately 13, 23, and 65 nm, respectively. The number of graphene layers contained within the walls at these respective growth temperatures are approximately 12, 24, and 50, respectively, while the graphene layers contained in their diaphragms are approximately 3, 9, and 20, respectively. Unlike CNTs with morphology comprising concentric cylindrical layers in their walls, CNTs with "bamboo-like" morphology have parabolic shaped layers stacked regularly along the length. The graphene layers of the bamboo-like CNTs terminate at the surface of the tubes, whereby the edges of the graphene layers are exposed. Both the number of graphene layers within the CNT tubule wall and the diaphragm of the compartment, therefore, increase with the temperature, while graphitization of the CNT tubules is significantly improved with increase in reaction temperature in methods of the present invention.

The synthetic methods for preparation of compounds and materials of the present invention, and examples of CNTs, catalytic materials and catalytic substrates are described in the following examples, which are not intended to be limiting in any manner with regards to the scope of the invention.

EXAMPLES

Example 1

Preparation of Catalyst Substrate for Synthesis of Linear CNTs

Mesoporous silica containing iron nanoparticles were prepared by a sol-gel process by hydrolysis of tetraethoxysilane (TEOS) in the presence of iron nitrate in aqueous solution following the method described by Li et al. (*Science*, (1996), Vol. 274, 1701–3) with the following modification. The catalyst gel was dried to remove excess water and solvents and calcined for 10 hours at 450° C. and $10^{-2}$ torr to give a silica network with substantially uniform pores containing iron oxide nanoparticles that are distributed within. The catalyst gel is then ground into a fine, micro-particulate powder either mechanically using a ball mill or manually with a pestle and mortar. The ground catalyst particles provide particle sizes that range between 0.1 and 100 µM under the grinding conditions.

Example 2

Preparation of Catalyst Substrate for Synthesis of Branched CNTs

Magnesium oxide (MgO) supported cobalt (Co) catalysts were prepared by dissolving 0.246 g of cobalt nitrate hexahydrate ($Co(NO_3)_2.6H_2O$, 98%) in 40 ml ethyl alcohol, following which immersing 2 g of particulate MgO powder (−325 mesh) were added to the solution with sonication for 50 minutes. The solid residue was filtered, dried and calcined at 130° C. for 14 hours.

Example 3

General Synthetic Procedure for Linear CNTs

The synthesis of CNTs is carried out in a quartz tube reactor of a chemical vapor deposition (CVD) apparatus. For each synthetic run, 100 mg of the micro-particulate catalyst substrate was spread onto a molybdenum boat (40×100 $mm^2$) either mechanically with a spreader or by spraying. The reactor chamber was then evacuated to $10^{-2}$ torr, following which the temperature of the chamber was raised to 750° C. Gaseous ammonia was introduced into the chamber at a flow rate of 80 sccm and maintained for 10 minutes, following which acetylene at a flow rate of 20 sccm was introduced for initiate CNT growth. The total gas pressure within the reaction chamber was maintained at a fixed value that ranged from 0.6 torr to 760 torr (depending on desired morphology for the CNTs). The reaction time was maintained constant at 2 hours for each run. The catalytic substrate containing attached CNTs were washed with hydrofluoric acid, dried and weighed prior to characterization.

Example 4

General Synthetic Procedure for Branched CNTs

The MgO supported cobalt catalyst of Example 3 were first reduced at 1000° C. for 1 hour in a pyrolytic chamber under a flow of a mixture hydrogen (40 sccm) and nitrogen (100 sccm) at a pressure of 200 Torr. The nitrogen gas was subsequently replaced with methane (10 sccm) to initiate CNT growth. The optimum reaction time for producing branched CNTs was 1 hour.

Example 5

Characterization of CNT Morphology and Purity by Scanning Electron Microscopy (SEM), and Tubule Structure and Diameter by Transmission Electron Microscopy (TEM)

Scanning electron microscopy (SEM) for characterization and verification of CNT morphology and purity was performed on a JEOL JSM-6340F spectrophotometer that was equipped with an energy dispersive x-ray (EDS) accessory. Standard sample preparation and analytical methods were used for the SEM characterization using a JEOL JSM-6340F microscope. SEM micrographs of appropriate magnification were obtained to verify tubule morphology, distribution and purity.

Transmission electron microscopy (TEM) to characterize individual tubule structure and diameter of the CNTs was performed on a JEOL 2010 TEM microscope. Sample specimens for TEM analysis were prepared by mild grinding the CNTs in anhydrous ethanol. A few drops of the ground suspension were placed on a micro-grid covered with a perforated carbon thin film. Analysis was carried out on a JEOL 2010 microscope. TEM micrographs of appropriate magnification were obtained for determination of tubule structure and diameter. Although the examples described herein have been used to describe the present invention in detail, it is understood that such detail is solely for this purpose, and variations can be made therein by those skilled in the art without departing from the spirit and scope of the invention.

The invention claimed is:

1. A process for preparation of a material comprising non-aligned carbon nanotubes comprising:
   providing, in a reactor, a catalyst material in the form of particles said catalyst material including a catalytic substrate comprising a sol-gel material or a mesoporous material impregnated with or having deposited thereon a metallic material, by providing a material surface in the reactor and placing the particles on the material surface;
   creating a substantially oxygen free atmosphere in the reactor and controlling the pressure within said reactor;
   feeding at least one carbon source gas into the reactor;
   providing thermal energy to heat the reactor to a reaction temperature to cause the carbon source gas to form nucleated tubules in the presence of the particles and cause the initiation of tubule growth into carbon nanotubes;
   feeding a mixture of gases comprising at least one promoter gas into the reactor to promote growth of carbon nanotubes; and
   producing carbon nanotubes that are non-aligned with respect to one another wherein the carbon nanotubes have a multi-walled or conically overlapping morphology;
   wherein the process further comprises introducing a catalyst gas comprising an organo-metallic material.

2. The process of claim 1 wherein the carbon source gas is a saturated or unsaturated linear hydrocarbon, branched hydrocarbon, cyclic hydrocarbon or a mixture thereof.

3. The process of claim 1 wherein the carbon source gas is selected from the group consisting of methane, n-propane, ethylene, acetylene, benzene carbon dioxide, natural gas, coal derivative gases and mixtures thereof.

4. The process of claim 1 wherein the carbon source gas is acetylene.

5. The process of claim 1 wherein the mesoporous sol-gel material is mesoporous silica, mesoporous alumina or mixtures thereof.

6. The process of claim 1 wherein the metallic material is a transition metal, metal alloy or a combination thereof.

7. The process of claim 1 wherein the metallic material is selected from the group consisting of iron, cobalt, nickel and combinations thereof.

8. The process of claim 1 wherein the metallic material is iron or cobalt.

9. The process of claim 1 wherein the catalytic substrate comprises at least one non-metallic material.

10. The process of claim 9 wherein the non-metallic material is an organic or inorganic oxide, nitride, sulfide or carbide compound.

11. The process of claim 10 wherein the inorganic oxide is selected from the group consisting of beryllium oxide, magnesium oxide, calcium oxide, strontium oxide and barium oxide.

12. The process of claim 10 wherein the inorganic oxide is magnesium oxide.

13. The process of claim 1 wherein the organo-metallic material is a metallocene.

14. The process of claim 13 wherein the metallocene is selected from the group consisting of ferrocene, nickelocene, cobaltocene and mixtures thereof.

15. The process of claim 1 wherein the promoter gas is ammonia, nitrogen, hydrogen, thiophene or mixtures thereof.

16. The process of claim 1 wherein the promoter gas is ammonia.

17. The process of claim 1 wherein the promoter gas is diluted by mixing it with a diluter gas chosen from the group consisting of hydrogen, iron pentacarbonyl, hydrogen sulfide, a ferrocene-xylene mixture or any combination thereof.

18. The process of claim 1 wherein the pressure measures from about $10^{-5}$ Torr to about 760 Torr.

19. The process of claim 1 wherein the pressure measures from about $10^{-3}$ Torr to about 100 Torr.

20. The process of claim 1 wherein the pressure is 760 Torr.

21. The process of claim 1 wherein the reaction temperature is maintained between 500° C. and 1050° C.

22. The process of claim 1 wherein the reaction temperature is maintained between 650° C. and 1500° C.

23. The process of claim 1 wherein the promoter gas is fed into the reactor prior to introduction of the carbon source gas in said reactor.

24. The process of claim 1 wherein the non-aligned carbon nanotubes are substantially comprised of linear unbranched tubules.

25. The process of claim 1 wherein the conically overlapping morphology is a segmentally conical stacked array morphology comprising at least one graphene layer in each segment.

26. The process of claim 1 wherein the non-aligned carbon nanotubes are substantially comprised of branched tubules having at least one branching node along the tubule axis.

27. The process of claim 1 wherein the non-aligned carbon nanotubes are substantially branched tubules wherein a Y-junction is formed in at least one branching node.

28. A method for forming non-aligned carbon nanotubes comprising:
   providing a catalyst material on a material surface in a reactor, the catalyst material including a mesoporous substrate material and a transition metal;
   introducing a promoter gas into the reactor;
   reducing an oxygen level and controlling the pressure within the reactor;
   introducing a carbon source gas into the reactor;
   introducing a catalyst gas comprising a metallocene into the reactor;
   heating the reactor to initiate growth of carbon nanotube tubules; and
   producing carbon nanotubes that are non-aligned with respect to one another wherein the carbon nanotubes have a multi-walled or conically overlapping morphology.

29. The method of claim 28 wherein the transition metal is selected from the group consisting of iron, cobalt, nickel and combinations thereof.

30. The method of claim 28 wherein the metallocene is selected from the group consisting of ferrocene, nickelocene, cobaltocene, a ferrocene-xylene mixture, and mixtures thereof.

31. The method of claim 28 wherein the promoter gas is selected from the group consisting of ammonia, ammonia-nitrogen, hydrogen, thiophene, iron pentacarbonyl and mixtures thereof.

32. The method of claim 28 wherein the promoter gas is ammonia.

33. The method of claim 28 wherein the pressure measures from about $10^{-5}$ Torr to about 760 Torr.

34. The method of claim 28 wherein the reaction temperature is maintained between about 500° C. and about 1500° C.

35. A method for making non-aligned Y-shaped carbon nanotubes comprising:
provide, on a material surface in a reactor, a catalyst material including a mesoporous substrate, a metallic material comprising a transition metal, and a non-metallic oxide, non-metallic nitride, non-metallic sulfide or non-metallic carbide;
introducing a promoter gas into the reactor;
reducing an oxygen level in the reactor and controlling the pressure within the reactor;
introducing at least one carbon source gas into the reactor;
introducing a catalyst gas comprising a metallocene into the reactor;
heating the reactor to grow carbon nanotube tubules; and
producing Y-shaped carbon nanotubes that are non-aligned with respect to one another wherein the carbon nanotubes have a multi-walled or conically overlapping morphology.

36. The method of claim 35 wherein the transition metal is selected from the group consisting of iron, cobalt, nickel and combinations thereof.

37. The method of claim 35 wherein the metallic material is deposited on a surface of non-metallic oxide, non-metallic nitride, non-metallic sulfide or non-metallic carbide.

38. The method of claim 35 wherein the metallocene is selected from the group consisting of ferrocene, nickelocene, cobaltocene, a ferrocene-xylene mixture and mixtures thereof.

39. The method of claim 35 wherein the promoter gas is selected from the group consisting of ammonia, ammonia-nitrogen, hydrogen, thiophene, iron pentacarbonyl and mixtures thereof.

40. The method of claim 35 wherein the promoter gas is ammonia.

41. The method of claim 35 wherein the pressure measures from about $10^{-5}$ Torr to about 760 Torr.

42. The method of claim 35 wherein the reaction temperature is maintained between about 500° C. and about 1500° C.

* * * * *

UNITED STATES PATENT AND TRADEMARK OFFICE
CERTIFICATE OF CORRECTION

PATENT NO. : 7,157,068 B2  Page 1 of 1
APPLICATION NO. : 10/151382
DATED : January 2, 2007
INVENTOR(S) : Li et al.

It is certified that error appears in the above-identified patent and that said Letters Patent is hereby corrected as shown below:

Column 18,
Line 17, should read -- 1500 °C -- not "1050 °C".
Line 19, should read -- 1050 °C -- not "1500 °C".

Signed and Sealed this

Fifth Day of February, 2008

JON W. DUDAS
*Director of the United States Patent and Trademark Office*